UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

AZO DYE.

SPECIFICATION forming part of Letters Patent No. 525,656, dated September 4, 1894.

Application filed July 6, 1894. Serial No. 516,721. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of a New Azo Coloring-Matter, of which the following is a specification.

My invention relates to a new azo-coloring-matter which can be derived from diazo-meta-dinitro-anilin and dialkyl-meta-sulfanilic acid. This latter component does not combine with the diazo-compounds from anilin, toluidin, sylidin and the like or only with great difficulty but I have discovered that it can be made to combine most readily with the diazo-compound of dinitranilin and that the new dye so obtained is characterized by most valuable properties in that it combines a great resisting power against the action of light, acids and washing with unsurpassed equalizing properties. It dyes wool from the acid bath giving full violet shades and possesses the following characteristics, it occurs as a dark crystalline powder and is somewhat soluble in cold water readily soluble in hot water giving violet solutions which turn red on the addition of hydrochloric acid no precipitate being formed; but it is precipitated from its aqueous solution by caustic alkalis as a violet precipitate; it gives a bluish-red solution in concentrated sulfuric acid. It is soluble in alcohol giving a bluish red solution, practically insoluble in ether and benzene. Its composition is represented by the following formula:

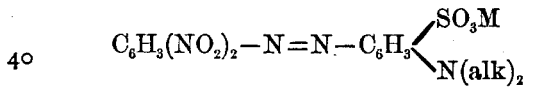

where M signifies an equivalent of a metal such as sodium, and Alk represents alkyl.

The following will serve to illustrate the manner in which the invention can best be carried into effect and the new dye obtained. Take a solution of the diazo-compound of dinitranilin prepared from about eighteen and three-tenths ($18\tfrac{3}{10}$) parts of this substance and run the diazo-solution into a solution of about twenty-five (25) parts of the sodium salt of di-ethyl-meta-sulfanilic acid, about fifty (50) parts of crystallized sodium acetate in about five hundred (500) parts of water. Stir while mixing and continuously for about three (3) hours more. The dye separates out as a crystalline precipitate. Filter, press and dry.

An equivalent product is obtained if in the above example the di-ethyl-meta-sulfanilic acid (sodium salt) is replaced by the equivalent quantity of the corresponding di-methyl-compound, and under the term alkyl in this specification I include methyl and ethyl.

Now, what I claim is—

The new azo-dye which can be derived from meta-dinitro-anilin and dialkyl-meta-sulfanilic acid, which possesses the formula

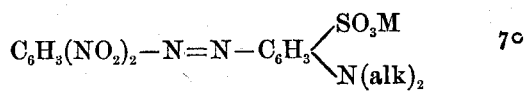

and which occurs as a crystalline powder somewhat soluble in cold water, readily soluble in hot water, giving a violet solution turning red but yielding no precipitate on the addition of hydrochloric acid, but being precipitated by caustic alkalis, and which is soluble in alcohol practically insoluble in benzene and ether and gives a bluish-red solution in concentrated sulfuric acid.

In testimony whereof I have hereunto set my hand in the presence of two subscribing witnesses.

PAUL JULIUS.

Witnesses:
ERNEST F. EHRHARDT,
ADOLPH REUTLINGER.